United States Patent Office

2,768,059
Patented Oct. 23, 1956

2,768,059

PROCESS FOR RECOVERY OF URANIUM AND THE UPGRADING OF ALKALI-URANIUM FLUORIDE PRECIPITATES

Richard H. Bailes, Walnut Creek, Robert O. Lindblom and Robert R. Grinstead, Concord, Calif., assignors, by mesne assignments, to the United States of America as represented by the United States Atomic Energy Commission No Drawing. Application June 3, 1953,
Serial No. 359,446

7 Claims. (Cl. 23—14.5)

This invention relates to a process for increasing the uranium content and decreasing the content of other materials in certain alkali metal uranium fluoride precipitates In the operation of ion exchange processes for recovering uranium from various materials, there is produced a variety of eluates containing uranium and various impurities. Processes of this character are disclosed in the copending applications of Richard H. Bailes and Ray S. Long; Serial Numbers 155,307 and 165,532, filed April 11, 1950 and June 1, 1950.

In said applications there are disclosed processes wherein anionic exchange resins are employed to absorb uranium in the uranyl state from industrial phosphoric acids or other crude phosphatic solutions. Subsequently, uranium is eluted by various methods whereby there is produced a solution containing uranyl uranium and a complex mixture of other materials. Uranium eluate solutions, particularly dilute chloride eluate or acidic chloride eluate solutions, produced by the said processes are suitable for treatment by the present process.

Now it has been discovered that the uranium values contained in such eluates can be recovered by a primary process wherein the uranium is precipitated as impure tetravalent double fluoride compounds with alkali metals including the compound $NaUF_5$. Furthermore, the invention provides a method whereby the uranium content of the precipitate can be raised by a significant amount by treatment with dilute HF solution.

Accordingly, it is an object of the invention to provide a method for purifying and recovering uranium from certain impure solutions thereof.

A further object of the invention is to provide a method for purifying and recovering uranium contained in eluates obtained from an anionic exchange recovery process.

A still further object of the invention is to provide a method of purifying and recovering uranium from anionic exchange process eluates by treatment with fluoride and reduction to precipitate an alkali metal uranous fluoride.

Another object of the invention is to provide a process for upgrading the uranium content of an alkali metal uranous fluoride precipitate by treatment with HF.

Other objects and advantages of the invention will become apparent from consideration of the following specification.

In general, in operating anionic exchange uranium recovery processes of the character noted above, uranium is adsorbed from an oxidized solution which also contains complexing agents such as phosphate, chloride, sulfate, etc., on a strongly basic anionic exchange resin. Subsequently, the uranium is eluted with appropriate elutriant solutions such as NaCl or HCl-NaCl mixtures whereby there is obtained an eluate solution containing uranium and a variety of impurities. For example, such an eluate may have a composition similar to that listed in the following table or may contain the impurities in much different concentrations. These impurities may be lacking and other impurities may be present, dependent upon the original solution composition, elutant composition and/or kind of materials added to the elutant.

TABLE I

| Constituent: | Concentration, g./l. |
|---|---|
| $U_3O_8$ | 0.29 |
| $F^-$ | 0.88 |
| Si | 0.10 |
| Ti | 0.07 |
| $Cl^-$ | 28.5 |
| $SO_4^=$ | 9.2 |
| $PO_4^\equiv$ | 1.4 |
| $SO_2$ | 3.5 |
| $V_2O_5$ | 0.02 |
| pH | Ca. 1.1 |

In accordance with the invention, a uranyl solution of the character described is treated with a solution of HF to provide an excess of fluoride ion therein. Subsequently, the pH of the solution is modified to a value within a quite definite range to provide a proper environment for the subsequent precipitation of the uranium. Then the solution is treated with a reducing agent such as electrolysis or a chemical reagent, preferably, $Na_2S_2O_4$, to reduce the hexavalent uranium to the tetravalent state whereupon a sodium uranous fluoride precipitate is formed in the solution.

It is essential in carrying out the foregoing procedure to provide the following conditions: A slight excess of fluoride ion and considerable sodium ion (above about 1 M) must be present and the pH of the solution should be in the range of about 1.1 to about 5.0, with a value of 2.0 to 3.0 preferred. Only a slight excess of fluoride should be present as a large excess will fail to precipitate the uranium since soluble fluoride complexes appear to be formed with this excess fluoride condition. With insufficient fluoride, various unsatisfactory precipitates such as uranous phosphates, etc., are formed and much uranium will remain in the solution. Reduction is carried to the point where all of the uranium is in the tetravalent state. Maximum precipitation is obtained at a temperature of 10–20° C. The sodium uranous fluoride precipitation is advantageous since the material is easily filtered and is stable towards oxidation in air whereby uranium would be redissolved and lost in filtrates and washes. Other alkali metals, e. g., K, Li, etc., produce similar precipitates. When impurities are present which are capable of reacting with the fluorides, e. g., Si, Ti, etc., additional fluoride ion is supplied to compensate therefor. The composition of the precipitate will vary from fairly pure $NaUF_5$ when prepared in solutions containing few impurities to a highly contaminated mixture of uranous compounds including $NaUF_5$ and $Na_2UF_6$ when prepared from more highly contaminated solutions.

It will be noted from the foregoing that the presence of sodium and additional fluoride in the compounds $NaUF_5$ and $Na_2UF_6$, as well as the presence of various impurities, reduces the proportion of uranium in the precipitate. In accordance with the invention the proportion of uranium in the precipitate is materially increased in the following manner: The sodium uranous fluoride precipitate is separated as by filtration from the solution. Then the precipitate is washed with a dilute aqueous solution of HF whereby sodium and fluoride, at least, are removed from the precipitate yielding a material containing $UF_4$ and, consequently, a much higher proportion of uranium.

With $NaUF_5$ the overall reaction which takes place is believed to be as follows:

$$NaUF_5 + HF \rightarrow UF_4 + NaHF_2$$

It will therefore be apparent that the compound NaUF5 is of value in the production of uranium tetrafluoride. Following completion of the washing step the purified precipitate is readily dried in air at about 110° C. Other alkali metal uranous fluorides would behave similarly as should be apparent to those skilled in the art.

Further details of the process of the invention will become apparent from the following examples.

*Example I*

A series of precipitation experiments were performed using actual and synthetic anionic exchange eluates while maintaining the pH above about 1.5 since previous experiments indicated that sulfur was formed from the reducing agent at lower pH values. No sulfur formation was noted in these experiments. $Na_2S_2O_4$ and 1 gram of HF per gram of $U_3O_8$ were added to the solution. The data for these precipitations are presented in Table II. Filtration of the product yielded a granular green precipitate which is easy to filter. Drying yielded a slightly impure NaUF5 product.

TABLE II

PRECIPITATION OF URANIUM FROM 1 M NaCl ELUATES WITH $Na_2S_2O_4$ AND HF 50 ml. samples of either Head A or B used. 30 mg. of HF, representing 300% of the stoichiometric amount of fluoride necessary for complete conversion of uranium to NaUF5, was added. The pH was adjusted with $NH_3$ or HCl. $Na_2S_2O_4$ added as a freshly prepared solution.

| Head | A (actual eluate) | B (synthetic soln.) |
|---|---|---|
| $U_3O_8$ (g./l.) | 0.58 | 0.56 |
| $SO_2$ (g./l.) | 16 | 16 |
| Cl⁻ (g./l.) | 0.8 M | 0.8 M |
| F⁻ (g./l.) | 0.87 | 0 |
| Ti (g./l.) | 0.15 | 0 |

| Head Soln. | $Na_2S_2O_4$ added, mg. | pH before $Na_2S_2O_4$ add'n. | Treatment | Filtrate pH | $U_3O_8$ in filtrate, g./l. | Percent Pptn. |
|---|---|---|---|---|---|---|
| A | 15 | 2.2 | Stood 4 hrs. at Rm. Temp. | 3.2 | 0.002 | 99.7 |
| A | 25 | 2.2 | do | 3.1 | 0.001 | 99.9 |
| A | 35 | 2.2 | do | 2.9 | 0.011 | 98.1 |
| A | 45 | 2.2 | do | 3.2 | 0.021 | 96.4 |
| A | 10 | 2.2 | do | 3.9 | 0.33 | 44 |
| A | 15 | 2.2 | do | 3.9 | 0.16 | 73 |
| A | 20 | 2.2 | do | 3.9 | 0.04 | 93 |
| A | 25 | 2.2 | do | 3.9 | 0.007 | 98.8 |
| A | 15 | 2.2 | $Na_2S_2O_4$ add'n. at 60° C. cooled 3 hrs. | 4.0 | 0.035 | 94 |
| A | 25 | 2.2 | do | 4.2 | 0.002 | 99.8 |
| A | 35 | 2.2 | do | 4.1 | 0.003 | 99.5 |
| A | 45 | 2.2 | do | 3.9 | 0.002 | 99.3 |
| B | 30 | 1.5 | Stood 15 hrs. at Rm. Temp. | 4.5 | 0.002 | 99.8 |
| B | 30 | 2.0 | do | 4.5 | 0.002 | 99.8 |
| B | 30 | 2.5 | do | 4.5 | 0.001 | 99.9 |
| B | 30 | 3.0 | do | 4.4 | 0.001 | 99.9 |
| B | 30 | 4.0 | do | 4.6 | 0.001 | 99.9 |
| B | 30 | 5.0 | do | 4.6 | 0.001 | 99.9 |
| A | 15 | 1.5 | Stood 2 days at Rm. Temp. | 4.9 | 0.21 | 64 |
| A | 20 | 1.5 | do | 4.8 | 0.021 | 96.4 |
| A | 25 | 1.5 | do | 4.6 | 0.003 | 99.5 |
| A | 30 | 1.5 | do | 4.3 | 0.002 | 99.8 |
| A | 40 | 1.5 | do | 4.1 | 0.024 | 95.9 |

*Example II*

In this experiment there was employed an actual eluate (ca. 1 M NaCl) having the following composition:

| | |
|---|---|
| $U_3O_8$ g./l. | 3.84 |
| Cl⁻ g./l. | 35 |
| $SO_4^=$ g./l. | 6.0 |
| V g./l. | 0.02 |
| Fe g./l. | 0.003 |
| pH | 1.5 |

0.7 g. of HF and 0.8 g. of $Na_2S_2O_4$ per gram of $U_3O_8$ were added to the eluate to precipitate the uranium. After filtration and drying the analysis of the product was as follows:

| | Percent |
|---|---|
| $U_3O_8$ | 65 |
| F | 28.9 |
| Na | 11.45 |
| $PO_4^\equiv$ | <0.02 |
| Si | 0.42 |
| Fe | 0.011 |
| V | 0.004 |
| Ti | 0.002 |

*Example III*

A pilot plant uranium eluate of about pH 1.8 containing $SO_2$, Cl⁻, Na⁺, Si, F, and other minor impurities was treated with caustic soda to raise the pH somewhat, HF was added, and then $Na_2S_2O_4$, to precipitate the uranium. The precipitate contained NaUF5 and some $Na_2SiF_6$ with other minor impurities giving a product with the following typical analysis:

| Substance | U | Na | Si | F |
|---|---|---|---|---|
| Percent | 42 | 12 | 3.0 | 34 |
| Mole Ratio | 1 | 3.06 | 0.608 | 10 |

*Example IV*

Crude NaUF5 similar to that described in Example III was washed with 2 liters of cold $H_2O$ and then 500 ml. of a 1.92% solution of HF thereby being converted into $UF_4$. The reaction appears to be as follows:

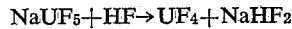

$$NaUF_5 + HF \rightarrow UF_4 + NaHF_2$$

The resultant product had the following composition, therefore being fairly pure $UF_4$:

| | Percent | Mole ratio |
|---|---|---|
| U | 65.2 | 1 |
| F | 22.6 | 4.34 |
| Na | 0.4 | 0.05 |
| Si | 0.4 | 0.05 |

While there has been described in the foregoing what may be considered to be preferred embodiments of the invention, various modifications may be made therein and it is intended to cover all such that come within the scope of the appended claims.

What is claimed is:

1. A process for recovering uranium values from an acidic uranyl anionic exchange eluate containing sodium ions comprising adding a slight excess of HF to the solution, adjusting the pH of the solution to a value in the range of 1.1 to 5.0, treating the solution with a reducing agent to convert the uranyl ions to the uranous state, thereby producing a sodium uranous fluoride precipitate, separating the precipitate from the solution, washing the precipitate with a dilute hydrofluoric acid solution, whereby the sodium uranous fluorides in the precipitate are converted to $UF_4$, and separating the $UF_4$ from the solution.

2. The process as otherwise defined in claim 1 but wherein said pH value is in the range of about 2.0 to 3.0 and wherein said hydrofluoric acid washing solution is about 2% HF.

3. The method of converting NaUF5 into $UF_4$ comprising contacting the insoluble NaUF5 with a dilute solution of hydrofluoric acid, whereby insoluble $UF_4$ is produced, and separating the solution from the insoluble $UF_4$.

4. The process as otherwise defined in claim 1 but wherein said reducing agent comprises electrolysis of the solution.

5. The process as otherwise defined in claim 1 but wherein said reducing agent comprises $Na_2S_2O_4$.

6. A process for recovering uranium values from an acidic uranyl anionic exchange eluate containing at least about 1 M of alkali metal ions comprising adding a slight excess of HF to the solution, adjusting the pH of the solution to a value in the range of 1.1 to 5.0, treating the solution with a reducing agent to convert the uranyl ions to the uranous state, thereby producing an alkali metal precipitate therein, separating the precipitate from the solution, washing the precipitate with a dilute hydrofluoric acid solution, whereby the alkali metal fluorides in the precipitate are converted to $UF_4$, and separating the $UF_4$ from the solution.

7. The method of converting an alkali metal uranous fluoride into $UF_4$ comprising contacting the insoluble alkali metal uranous fluoride with a dilute solution of hydrofluoric acid, whereby insoluble $UF_4$ is produced, and separating the solution from the insoluble $UF_4$.

References Cited in the file of this patent

Mellor: Comprehensive Treatise of Inorganic and Theoretical Chemistry, vol. 12, page 75 (1932). Published by Longmans, Green & Co., London.

Katz et al.: The Chemistry of Uranium, page 377–9 (1951). McGraw-Hill Book Co., New York.